(12) United States Patent
Hardy

(10) Patent No.: US 7,404,494 B2
(45) Date of Patent: Jul. 29, 2008

(54) KINETIC INERTIAL DELIVERY SYSTEM

(75) Inventor: Stephen Hardy, Wadsworth, OH (US)

(73) Assignee: RTC Industries, Inc., Rolling Meadows, IL (US)

( * ) Notice: Subject to any disclaimer, the term of this patent is extended or adjusted under 35 U.S.C. 154(b) by 0 days.

(21) Appl. No.: 11/050,157

(22) Filed: Feb. 3, 2005

(65) Prior Publication Data

US 2005/0189309 A1 Sep. 1, 2005

Related U.S. Application Data

(60) Provisional application No. 60/541,859, filed on Feb. 3, 2004.

(51) Int. Cl.
 *A47F 1/04* (2006.01)
 *A47F 3/08* (2006.01)

(52) U.S. Cl. .................... 211/59.3; 211/59.2; 211/59.4; 211/1.57

(58) Field of Classification Search ................ 211/59.3, 211/51, 1.57; 312/61, 71; 206/817, 221
See application file for complete search history.

(56) References Cited

U.S. PATENT DOCUMENTS

| | | |
|---|---|---|
| 1,156,140 A | 10/1915 | Hair |
| 1,712,080 A | 5/1929 | Kelly |
| 1,734,031 A | 11/1929 | Carlson |
| 1,786,392 A | 12/1930 | Kemp |
| 1,971,749 A | 8/1934 | Hamilton |
| 1,991,102 A | 2/1935 | Kemaghan |
| 2,057,627 A | 10/1936 | Ferris |
| 2,079,754 A | 5/1937 | Waxgiser |
| 2,085,479 A | 6/1937 | Shaffer |
| 2,110,299 A | 3/1938 | Hinkle |
| 2,111,496 A | 3/1938 | Scriba |
| 2,555,102 A | 5/1951 | Anderson |
| 2,652,154 A | 9/1953 | Stevens |
| 2,670,853 A | 3/1954 | Schneider |
| 2,678,045 A | 5/1954 | Erhard |

(Continued)

FOREIGN PATENT DOCUMENTS

CH 412 251 4/1966

(Continued)

OTHER PUBLICATIONS

FFr Yello Pages ™ 2003 Product Catalog, "Merchandising Ideas Made Easy for Every Retail Environment!", Cover pg., 9-11, 48-49, 52-58, Back Cover.

*Primary Examiner*—Kambiz Abdi
*Assistant Examiner*—Lindsay M. Maguire
(74) *Attorney, Agent, or Firm*—Banner & Witcoff, Ltd.

(57) ABSTRACT

A system for front facing products without the use of product pushers or shelf dividers includes a generally flat panel which supports products and a motion providing device adapted to come into contact with the panel. The motion providing device may include a motor-driven cam that moves the panel quickly in one direction and then slowly in the opposite direction. During the quick movement of the panel, the friction between the panel and the products resting on the panel is released and the panel generally moves under the products while the products remain generally stationary. In this manner, products can be moved to the front end of a panel without use of a product pusher.

11 Claims, 2 Drawing Sheets

U.S. PATENT DOCUMENTS

| | | |
|---|---|---|
| 2,918,295 A | 12/1959 | Milner |
| 2,948,403 A | 8/1960 | Vallez |
| 3,083,067 A | 3/1963 | Vos |
| 3,103,396 A * | 9/1963 | Portnoy ................ 312/126 |
| 3,151,576 A | 10/1964 | Patterson |
| 3,161,295 A | 12/1964 | Chesley |
| 3,285,429 A | 11/1966 | Propst |
| 3,308,961 A | 3/1967 | Chesley |
| 3,308,964 A | 3/1967 | Pistone |
| 3,348,732 A | 10/1967 | Schwarz |
| 3,452,899 A | 7/1969 | Libberton |
| D219,058 S | 10/1970 | Kaczur |
| 3,598,246 A | 8/1971 | Galli |
| 3,652,154 A | 3/1972 | Gebel |
| 3,667,826 A | 6/1972 | Wood et al. |
| 3,698,568 A | 10/1972 | Armstrong |
| 3,709,371 A | 1/1973 | Luck |
| 3,751,129 A | 8/1973 | Wright et al. |
| 3,814,490 A | 6/1974 | Dean et al. |
| 3,815,519 A | 6/1974 | Meyer |
| 3,830,169 A | 8/1974 | Madey |
| 3,836,008 A | 9/1974 | Mraz |
| 3,868,021 A | 2/1975 | Heinrich |
| 3,870,156 A | 3/1975 | O'Neill |
| 4,042,096 A | 8/1977 | Smith |
| 4,106,668 A | 8/1978 | Gebhardt et al. |
| 4,269,326 A | 5/1981 | Delbrouck |
| 4,300,693 A | 11/1981 | Spamer |
| 4,303,162 A | 12/1981 | Suttles |
| 4,331,243 A | 5/1982 | Doll |
| 4,351,439 A | 9/1982 | Taylor |
| 4,378,872 A | 4/1983 | Brown |
| 4,467,927 A | 8/1984 | Nathan |
| 4,482,066 A | 11/1984 | Dykstra |
| 4,488,653 A | 12/1984 | Belokin |
| 4,504,100 A | 3/1985 | Chaumard |
| 4,588,093 A | 5/1986 | Field |
| 4,589,349 A | 5/1986 | Gebhardt et al. |
| 4,602,560 A | 7/1986 | Jacky |
| 4,615,276 A | 10/1986 | Garabedian |
| 4,620,489 A | 11/1986 | Albano |
| 4,685,574 A | 8/1987 | Young |
| 4,705,175 A | 11/1987 | Howard et al. |
| 4,706,821 A | 11/1987 | Kohls |
| 4,724,968 A | 2/1988 | Wombacher |
| 4,729,481 A | 3/1988 | Hawkinson |
| 4,730,741 A | 3/1988 | Jackle |
| 4,762,236 A | 8/1988 | Jackle |
| 4,775,058 A | 10/1988 | Yatsko |
| 4,776,472 A | 10/1988 | Rosen |
| 4,828,144 A | 5/1989 | Garrick |
| 4,830,201 A | 5/1989 | Breslow |
| 4,836,390 A | 6/1989 | Polvere |
| 4,846,367 A | 7/1989 | Guigan et al. |
| 4,883,169 A | 11/1989 | Flanagan, Jr. |
| 4,899,668 A | 2/1990 | Valiulis |
| 4,901,853 A * | 2/1990 | Maryatt ................ 206/722 |
| 4,907,707 A | 3/1990 | Crum |
| 4,934,645 A | 6/1990 | Breslow |
| 5,012,936 A | 5/1991 | Crum |
| 5,025,936 A | 6/1991 | Lamoureaux |
| 5,027,957 A | 7/1991 | Skalski |
| 5,082,125 A | 1/1992 | Ninni |
| 5,088,607 A | 2/1992 | Risafi et al. |
| 5,110,192 A * | 5/1992 | Lauterbach ................ 312/71 |
| 5,111,942 A | 5/1992 | Bernardin |
| 5,123,546 A | 6/1992 | Crum |
| 5,148,927 A | 9/1992 | Gebka |
| 5,161,702 A | 11/1992 | Skalski |
| 5,178,258 A | 1/1993 | Smalley |
| 5,183,166 A | 2/1993 | Belokin, Jr. et al. |
| 5,190,186 A | 3/1993 | Yablans |
| 5,203,463 A | 4/1993 | Gold |
| 5,215,199 A | 6/1993 | Bejarano |
| 5,255,802 A | 10/1993 | Krinke et al. |
| 5,265,738 A | 11/1993 | Yablans |
| 5,316,154 A | 5/1994 | Hajec, Jr. |
| 5,341,945 A | 8/1994 | Gibson |
| 5,351,839 A | 10/1994 | Beeler et al. |
| 5,366,099 A | 11/1994 | Schmid |
| 5,390,802 A | 2/1995 | Pappagallo |
| 5,415,297 A | 5/1995 | Klein et al. |
| 5,450,969 A | 9/1995 | Johnson |
| 5,458,248 A | 10/1995 | Alain |
| 5,464,105 A | 11/1995 | Mandeltort |
| 5,469,976 A | 11/1995 | Burchell |
| 5,542,552 A | 8/1996 | Yablans |
| 5,562,217 A | 10/1996 | Salveson |
| 5,613,621 A | 3/1997 | Gervasi |
| D378,888 S | 4/1997 | Bertilsson |
| 5,615,780 A | 4/1997 | Nimetz et al. |
| 5,634,564 A | 6/1997 | Spamer |
| 5,665,304 A | 9/1997 | Heinen et al. |
| 5,673,801 A | 10/1997 | Markson |
| D386,363 S | 11/1997 | Dardashti |
| 5,685,664 A | 11/1997 | Parham |
| 5,730,320 A | 3/1998 | David |
| 5,738,019 A | 4/1998 | Parker |
| 5,740,944 A | 4/1998 | Crawford |
| 5,746,328 A | 5/1998 | Beeler |
| 5,826,731 A | 10/1998 | Dardashti |
| 5,839,588 A | 11/1998 | Hawkinson |
| 5,855,283 A | 1/1999 | Johnson |
| 5,878,895 A | 3/1999 | Springs |
| 5,906,283 A | 5/1999 | Kump et al. |
| 5,971,204 A | 10/1999 | Apps |
| 6,006,678 A | 12/1999 | Merit |
| 6,041,720 A | 3/2000 | Hardy |
| 6,082,557 A | 7/2000 | Leahy |
| 6,112,938 A | 9/2000 | Apps |
| 6,129,218 A | 10/2000 | Henry et al. |
| 6,142,317 A | 11/2000 | Merl |
| 6,164,491 A * | 12/2000 | Bustos et al. ................ 221/211 |
| 6,173,845 B1 | 1/2001 | Higgins et al. |
| 6,209,733 B1 | 4/2001 | Higgins et al. |
| 6,227,385 B1 | 5/2001 | Nickerson |
| 6,234,325 B1 | 5/2001 | Higgins et al. |
| 6,234,326 B1 | 5/2001 | Higgins et al. |
| 6,234,328 B1 | 5/2001 | Mason |
| D445,615 S | 7/2001 | Burke |
| 6,253,954 B1 | 7/2001 | Yasaka |
| 6,357,606 B1 | 3/2002 | Henry |
| 6,382,431 B1 | 5/2002 | Burke |
| 6,401,942 B1 | 6/2002 | Eckert |
| 6,405,880 B1 | 6/2002 | Webb |
| 6,409,027 B1 | 6/2002 | Chang et al. |
| 6,409,028 B2 | 6/2002 | Nickerson |
| 6,464,089 B1 | 10/2002 | Rankin, VI |
| 6,484,891 B2 | 11/2002 | Burke |
| 6,497,326 B1 | 12/2002 | Osawa |
| 6,523,703 B1 | 2/2003 | Robertson |
| 6,527,127 B2 | 3/2003 | Dumontet |
| 6,533,131 B2 | 3/2003 | Bada |
| D472,411 S | 4/2003 | Burke |
| 6,622,874 B1 | 9/2003 | Hawkinson |
| 6,655,536 B2 | 12/2003 | Jo et al. |
| 6,666,533 B1 | 12/2003 | Stavros |
| D485,699 S | 1/2004 | Mueller et al. |
| 6,772,888 B2 | 8/2004 | Burke |
| 6,866,156 B2 | 3/2005 | Nagel et al. |
| 6,948,900 B1 | 9/2005 | Neuman |
| 6,964,235 B2 | 11/2005 | Hardy |
| 7,093,546 B2 | 8/2006 | Hardy |
| 7,216,770 B2 | 5/2007 | Mueller |

| | | | | | | |
|---|---|---|---|---|---|---|
| 2001/0010302 | A1 | 8/2001 | Nickerson | EP | 0 454 586 | 10/1991 |
| 2002/0036178 | A1 | 3/2002 | Tombu | EP | 0587059 | 3/1994 |
| 2002/0108916 | A1 | 8/2002 | Nickerson | EP | 0 779047 B1 | 6/1997 |
| 2002/0170866 | A1 | 11/2002 | Johnson et al. | EP | 986980 | 3/2000 |
| 2003/0010732 | A1 | 1/2003 | Burke | EP | 1395152 | 5/2005 |
| 2003/0057167 | A1 | 3/2003 | Johnson et al. | EP | 0176209 | 4/2008 |
| 2003/0061973 | A1 | 4/2003 | Bustos | FR | 2 385 365 | 12/1978 |
| 2003/0085187 | A1 | 5/2003 | Johnson et al. | FR | 2526338 | 11/1983 |
| 2003/0141265 | A1 | 7/2003 | Jo et al. | FR | 2617385 | 1/1989 |
| 2003/0217980 | A1 | 11/2003 | Johnson et al. | GB | 740311 | 11/1955 |
| 2004/0104239 | A1 * | 6/2004 | Black et al. .......... 221/124 | GB | 881700 | 11/1961 |
| 2004/0140278 | A1 | 7/2004 | Johnson et al. | GB | 2 027339 | 2/1980 |
| 2004/0140279 | A1 | 7/2004 | Johnson et al. | GB | DES. 2037553 | 7/1994 |
| 2006/0049122 | A1 | 3/2006 | Johnson et al. | GB | 2281289 | 1/1995 |
| | | | | GB | 2 283 407 A | 5/1995 |
| | | | | GB | 2290077 | 12/1995 |
| | | | | GB | 1088654 | 11/2000 |

FOREIGN PATENT DOCUMENTS

| | | | | | |
|---|---|---|---|---|---|
| DE | 2002720 | 7/1971 | JP | 59 218113 | 8/1984 |
| DE | 2 825 724 A1 | 12/1979 | JP | 11342054 | 12/1999 |
| DE | 8308485 | 9/1983 | SU | 1600615 | 10/1990 |
| DE | 299-02688 U1 | 7/1999 | WO | WO 91/15141 A | 10/1991 |
| EP | 0018003 | 7/1984 | WO | 00 71004 | 11/2000 |
| EP | 270016 | 6/1988 | WO | 2003/032775 | 4/2003 |
| EP | 0 337340 | 10/1989 | | | |
| EP | 0 398 500 | 11/1990 | | | |

* cited by examiner

KINETIC INERTIAL DELIVERY SYSTEM

CROSS REFERENCE TO RELATED APPLICATION

This Non-Provisional Application claims benefit to U.S. Provisional Application No. 60/541,859, filed Feb. 3, 2004.

FIELD OF THE INVENTION

The present invention relates generally to a shelf assembly for use in merchandising product and more particularly to a shelf assembly having improved mechanisms for pushing product toward the front of the shelves.

BACKGROUND OF THE INVENTION

It is known that retail and wholesale stores, such as drug stores, grocery stores, discount stores, toy stores, and the like require a large amount of shelving both to store product and to display the product to consumers. In displaying product, it is desirable for the product on the shelves to be situated toward the front of the shelf so that the product is visible and accessible to consumers. To accomplish this placement of product, known systems include the use of gravity or a pusher system to push the product toward the front of the shelf as the product at the front of the shelf is removed. Known systems also use dividing panels or dividers to separate product on the shelf to provide better organization of the product and to make the display of the product more appealing to consumers. Known merchandising systems that incorporate the use of pusher mechanisms can be found in U.S. Pat. No. 6,041,720 to Hardy and U.S. Pat. No. 4,830,201 to Breslow, and application PCT/US02/15760, all of which are assigned to RTC Industries, Inc and are incorporated in this application.

Known merchandising systems that use pusher mechanisms require multiple components including pusher paddles configured to operatively engage a track in a base wall, and biasing elements to urge the pusher paddles and accompanying product toward the front of the shelf. While these known systems have been mostly effective, there is continuously a need in the art for more cost effective and less complex merchandising systems.

The present invention is directed at improving upon existing merchandising systems.

BRIEF SUMMARY OF THE INVENTION

The present invention overcomes some drawbacks of previous systems. As will become evident below, the present invention allows for products in a retail setting to be front faced and may maintain the products in an organized appearance without the need for pushers or product dividers. Product can be moved to a forward position through manipulation of the friction bond between the product and the panel supporting the product. In the present invention a panel supporting product can be moved at a slow and a fast speed. At the slow speed, the friction bond between the product and the panel remains in place and the product moves with the panel. At the fast speed, the friction bond is broken and the product does not generally move while the panel moves underneath the product. The invention also encompasses a panel that is adaptable to oscillate and repeatedly contact a barrier at one end, thereby moving product on top of the panel in a direction away from the barrier.

Other features and advantages of the invention will become apparent to those skilled in the art upon review of the following detailed description, claims and drawings in which like numerals are used to designate like features.

Figure 1:
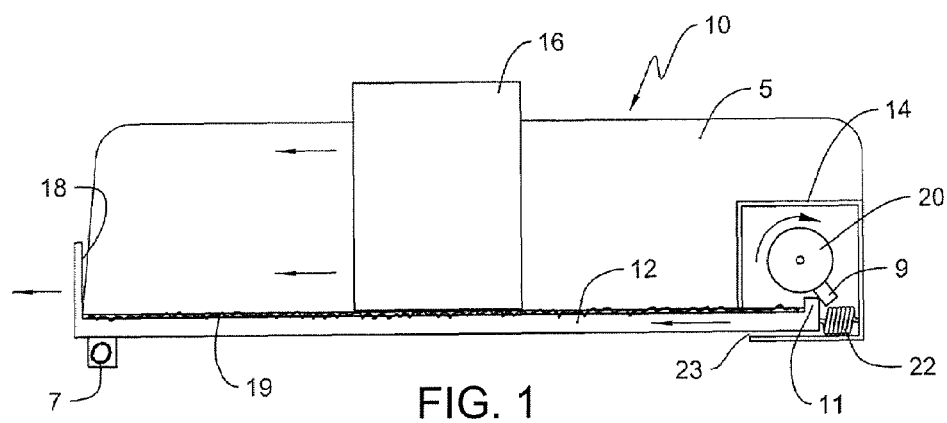
FIG. 1 depicts a side elevation view of an exemplary system in which product on a panel or floor moves with the panel of floor.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

DETAILED DESCRIPTION OF EMBODIMENTS OF THE INVENTION

The invention can involve vibration or quick movements that orient products in a particular direction on a shelf. Vibration can cause products to move forward on a shelf and prevent them from moving backward so that the product is front facing. This vibration may be applied through mechanical, electrical or other structures or designs.

In one embodiment, directed vibration moves product toward the front of the shelf. The directed vibration causes product to move in particular directions or in one direction and not to move in other directions. Through this vibration, which is instituted through a floor, ceiling, wall or similar structure, or through a vibrative pulse or signal traveling through the air, the product moves in a particular direction, such as frontward.

In an embodiment, general undirected vibration is applied to the system. This vibration may be applied through the floor, wall, ceiling, other structure or through vibration or a signal traveling through the air. Directors, such as small toggles, ridges, flanges, fingers, or the like, cause product to move in a particular direction depending on their configuration, shape, and orientation. These directors can channel the energy from unspecific vibration and force product in a particular direction, such as frontward. The directors can be placed on the floors, walls or ceilings of the system and can be incorporated into the product itself. The directors can be made of plastic or other material and can be applied in a patterned or unpatterned manner, and products can rest on the directors. General vibration can then be applied continuously, periodically or after an event such as removal of a product. The vibration causes the directors to vibrate and when the directors then contact a product, they move the product in a predetermined direction, such as forward.

The invention may be embodied in various forms. Referring to the Figures wherein like numerals indicate like elements, there is depicted in FIG. 1 an exemplary embodiment of the invention that utilizes friction to move product toward the front of the shelf and quick motion in the opposite direction to keep the product at the front of the shelf. This quick motion breaks the bond of friction between the product and the floor on which it sits, thereby leaving the product in the forward, advanced position.

Figure 2:
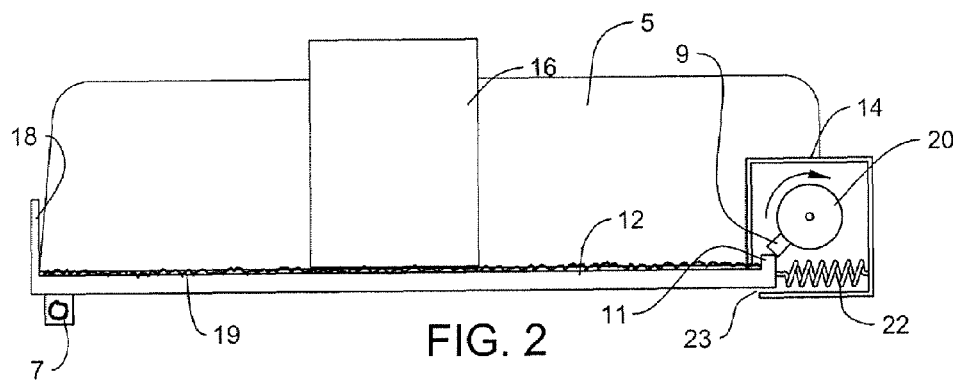
FIG. 2 depicts a side view of the exemplary system of FIG. 1 in which the product and the panel of floor have ceased moving.
Figure 3:
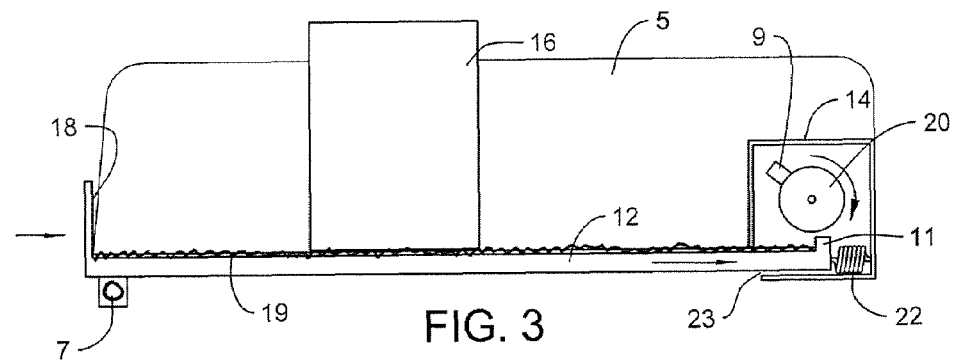
FIG. 3 depicts a side view of the exemplary system of FIGS. 1 and 2 in which the panel or floor moves quickly in such a manner that the product remains stationary and the panel or floor moves underneath the product.

As depicted in FIGS. 1-3, a friction merchandising system 10 includes a flat surface panel 12 operatively coupled to a motion providing device 14. The flat surface panel can operate as a floor. The system 10 may or may not include a divider panel 5 to divide and organize product on the shelf. The system may also include a front panel retainer, barrier or fence 18 for preventing product from falling off the shelf. The system 10 is positioned on the shelves and may be mounted to the shelves through various mounting techniques.

In use, product is placed on the flat surface panel 12 and a combination of gravity and friction hold the product in place on the flat surface panel 12. The motion providing device 14 then slowly moves the flat surface panel 12 toward the front panel retainer 18 located at the front of the shelf. After a preset amount of time, or through product position sensing techniques, the motion providing device 14 quickly, in a jerking motion, pulls the flat surface panel 12 in the opposite direction or, in other words, toward the back of the shelf. By doing so, the quick motion of the flat surface panel 12 breaks the bond of friction between the product and the flat surface panel 12 causing the flat surface panel 12 to slide relative to the product and the product to remain substantially at its location. The motion providing device 14 will then repeat the previously described process and begin to slowly move the flat surface panel 12 toward the front panel retainer 18.

The process described above may continue for a preset amount of time and then stop for a preset amount of time before resuming. Alternatively, the process described above may continue until product detecting sensors 7 indicate that the product is properly positioned near the front of the shelf at which point the sensors would signal the motion providing device 14 to discontinue the movement.

As another alternative, the process may repeat continuously even after the product is moved to the front of the shelf because as the product contacts the front retaining wall, which prevents further forward movement, the flat surface panel 12 will slide under the product. The flat surface panel 12 will also slide relative to the product as the motion providing device 14 quickly pulls the flat surface panel 12 in the opposite direction, thereby keeping the product at the front of the shelf.

In one embodiment, the flat surface panel 12 may be a rigid, thin material that is operatively connected to the motion providing device 14. The material may be a material comprised of polyethylene, polypropylene, nylon or a combination of plastics that may also be ribbed. The material may also have low friction beads 19 running from one end to the other to permit the product to more easily slide along the surface panel 12 when the panel is pulled quickly. The flat surface panel 12 could be configured and sized to push a single row of product, multiple rows of product, or an entire shelf of product at a time.

The motion providing device 14 may be positioned and mounted near the back of the shelf and may include a motor-driven cam 20 that provides slow motion in one direction, and a spring 22 that is operatively connected to the cam 20 and/or the panel 12 to provide a quick motion in the opposite direction. The motor-driven cam 20 may have a tab 9 that, in use, contacts flange 11 on the panel 12, as depicted by FIGS. 1-3. The motion providing device 14 may include a flange, channel or slot 23 to connect the flat surface panel 12 to the motion providing device 14. One skilled in the art will appreciate that other techniques for mounting the flat surface panel 12 to the motion providing device 14 are possible.

In another embodiment, the motion providing device 14 may be a spring mechanism that biases the flat surface panel 12 forward and then snaps the surface panel 12 in the opposite direction.

In still another embodiment, the motion providing device 14 may be a device that provides vibration to the flat surface panel 12, such as through an oscillating transducer or other known devices that provide frequency type vibration. The frequency of the vibration could be controlled to direct the product toward the front of the shelf.

Figure 4:
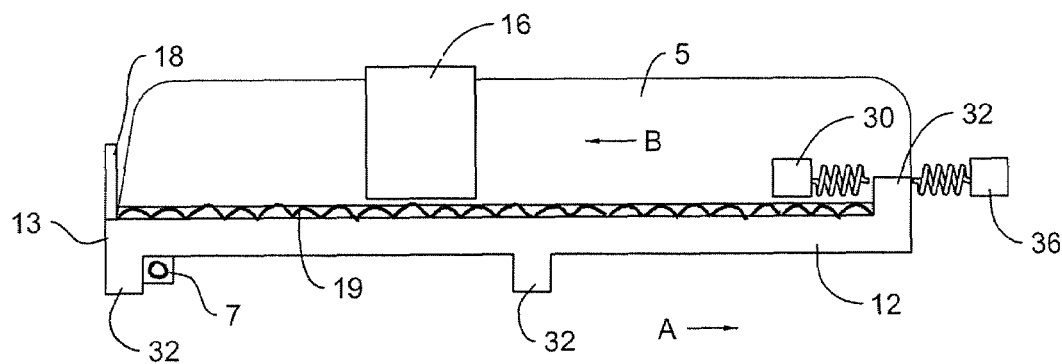
FIG. 4 depicts a side view of the exemplary system, incorporating flanges and motion providing devices.
Figure 5:
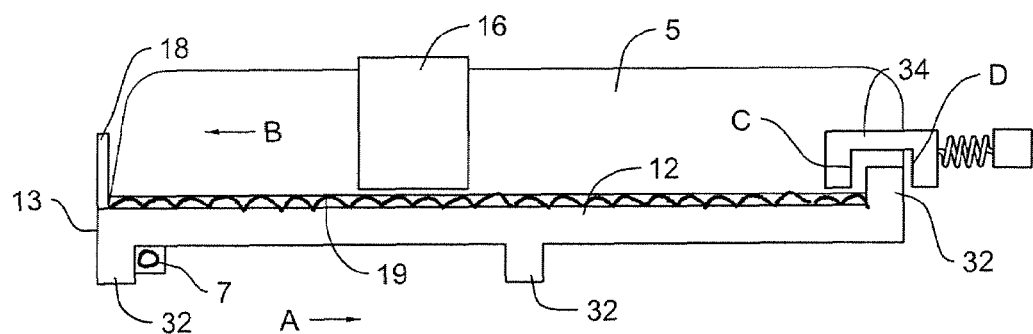
FIG. 5 depicts a side view of the exemplary system incorporating one motion providing device with multiple facets.

Referring to FIGS. 4 and 5, in another embodiment, a motion providing device 30, 34 contacts a floor or panel 12 in a rapid manner in a rearward direction (signified by A in FIGS. 4 and 5). This rapid contact in some embodiments can be characterized as a strike. A bar, pole, flange, block or extension can be incorporated into the motion providing device to rapidly contact the panel. The rapid contact can occur on the end 13 of the panel 12 or at a flange 32 on the panel. The flange 32 can include a ridge, tab, protuberance or other flange. The rapid contact forces the panel rearward in a relatively short amount of time. When the panel moves rearward quickly, it breaks its friction bond with product 16 sitting on its surface. The product 16 generally does not move as panel moves under the product.

After the rapid contact of the motion providing device 30, 34, the panel is again contacted by a motion providing device 36, 34. This contact is done in a slower, more gradual manner and slowly moves the panel forward. The device that slowly moves the panel forward can be same device 34 that moved it rearward (as in FIG. 5) or it can be a separate motion providing device 36 (as in FIG. 4). As the panel is slowly moving forward, the mechanical connection (i.e., friction) between the panel and product on the panel remains intact. In this manner, when the panel moves forward, the product substantially moves forward with the panel.

Where the same motion providing device is used to contact the panel in the forward and rearward directions, in some embodiments, one portion of the device contacts the panel in one direction and another part of the device contacts the panel in another direction. In an embodiment, portion C of the motion providing device 34 rapidly contacts the panel to move it rapidly in the rearward direction. Portion D of the motion providing device 34 contacts the panel to move it gradually in the frontward direction.

After the panel 12 moves forward, it can then again be rapidly contacted by a motion providing device. This rapid contact again releases the hold of friction between the product 16 and the panel 12. The panel can then again gradually be moved forward. Through several repetitions of the rapid contact and gradual movement in the opposite direction, objects can be oriented toward the front of the panel 12.

A motion providing device can be configured to repeatedly contact the panel a number of times in quick or slow repetition. The repetition can occur on a continuous basis, periodically, at a predetermined time or after an event such as the removal of a product from the front of a panel. A motion providing device also can repeatedly contact a flange 32 of the panel on which product sits. The flange 32 can be located at one or more of various locations along the panel, such as at the back, front or middle of the panel, and can be located on the top or the bottom portion of the panel. The rapid contact causes the panel to move in a rearward direction, away from the front of the panel. Product that has been placed on the panel generally does not move with the panel when it is struck (i.e., rapidly moved forward). A motion providing device can then contact the flange gradually in the opposite direction to gradually return the panel to its earlier position. During this gradual movement, product remains in contact with the panel (through friction and gravity) such that the product generally gradually moves with the panel.

Figure 6:
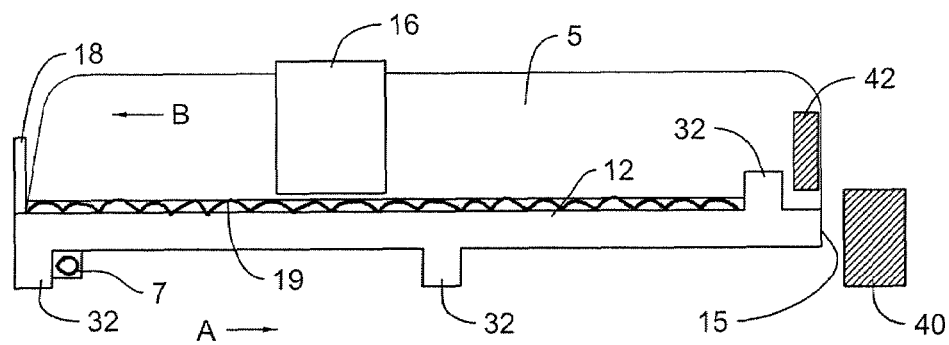
FIG. 6 depicts a side view of the exemplary system adaptable to oscillate and contact a barrier on one end.

In another embodiment shown in FIG. 6, a panel 12 can oscillate back and forth. The panel also can contact a barrier 40, 42, causing the product 16 to move relative to the panel 12. A panel 12 can be made to oscillate back and forth in the directions shown as A and B in FIG. 6. The panel can then repeatedly contact a barrier 40, 42 at the end of its movement in direction A. Through this repeated motion, a product 16 sitting on the panel can be made to move in the direction B toward the front of the panel.

The end 15 of the panel 12 can contact a barrier 40, 42. The barrier can be a wall, pole, upright, extension, bar, block or other object. In addition, the panel 12 can contain a flange 32. The flange can include a ridge, tab, protuberance or other flange. The flange 32 can be located at various positions on the panel, such as the front, back, middle, top or bottom of the panel. As the panel oscillates, the flange can contact a barrier 42.

The oscillation of the panel can be over very small distances (millimeters or less) or larger distances (centimeters or more). The oscillation can occur continuously, can occur at pre-set intervals or times or can occur upon the occurrence of certain events, such as the removal of a product. Common means for oscillating objects such as a panel are well understood in the art. Such means include mechanical means, an oscillating transducer, cams and springs, such as those used in the motion providing device 14, levers, and signal and vibration generators.

In some embodiments, at the end of the oscillation of the panel in the direction A, the panel contacts a barrier. At the end of the oscillation of panel in direction B, the panel does not contact a barrier. By oscillating the panel and contacting or not contacting barriers in this manner, the friction between a product and the panel is manipulated such that the product moves on the panel in the direction opposite the direction the panel is moving immediately prior to the contact between the panel and the barrier. As shown in FIG. 6, such oscillation and contacting can cause the product to move forward on the panel in direction B.

A retainer 18 can be incorporated toward the front of panel 12. The retainer substantially prevents product from falling off the panel. The retainer can act as a fence or barrier. The retainer can be integral with the panel 12 or can be connected to the panel through use of a rail or other connection means well known in the art including screws, bolts, notches, flanges and adhesives.

The motion providing devices 14, 30, 32, 34 may be positioned and mounted at any place relative to the panel, including, near the back of the panel, at the front of the panel or in the middle of the panel. The motion providing device may include a motor-driven cam that provides motion in one or two directions. The motion providing device can include a spring or pusher. The spring or pusher can operate independently or can be operatively connected to the cam. The motion providing device may include a flange, channel or slot to connect a panel, a stationary surface or a wall. The motion providing device can be operatively connected to the panel. One skilled in the art will appreciate that other techniques for incorporating the motion providing device with the panel are possible.

In some embodiments, the system is not mounted to a shelf and the panel functions as a shelf. In some embodiments a shelf takes the place of the panel. Thus, rather than resting on a panel, the product rests on a shelf. The shelf in these embodiments performs the same tasks as the panel described herein.

In yet another embodiment, it is contemplated that magnetics may be used to provide the desired motion to the flat surface panel 12.

Significantly, and in contrast with spring pusher systems, with the present invention, there generally will be substantially no resistance when trying to pull product off the panel. There also generally will be no resistance when replacing product previously removed. Thus, it is relatively easy for consumers to replace product they choose not to purchase. In addition, stocking of shelves by store personnel is much easier than with spring-based pusher systems. Product need not be pushed in a particular direction to be stocked or re-stocked. Stocking or re-stocking can occur from one or more of the front, rear, top, bottom or side of a panel.

The lack of resistance allows for easier movement of non-square and non-rectangular products. In addition, products can be relatively easily removed from the middle of a particular row or facing. Subsequent movement of the system will close any gaps caused by such removed product.

In addition, the use of dividers is optional as the product will be moving together on the flat surface panel 12 and thus the problems associated with product inter-leafing may be reduced or eliminated. If dividers are desired with the invention, the dividers may only need to be very thin membranes to separate the products, as opposed to the bulkier, rigid dividers often used with spring pusher systems. Moreover, with the present invention, no pushers are required to move product toward the front of the shelves.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A product delivery system comprising: a generally flat horizontal panel adaptable for supporting at least one product, and a motion providing device adaptable to come in contact with the panel and to move the panel in a first direction and a second direction, wherein the motion providing device moves the panel in a first direction at a first rate and moves the panel in the second direction at a second rate, wherein the first rate is greater than the second rate, and wherein at least one product generally does not move with the panel when the motion providing device moves the panel at the first rate and the product generally moves with the panel when the motion providing device moves the panel at the second rate; and wherein the panel further defines low friction beads attached to a top surface of the panel.

2. The product delivery system of claim 1, further comprising a front retainer that is located toward an end of the horizontal panel.

3. The product delivery system of claim 2 wherein the motion providing device comprises a cam and a spring, and the motion providing device is adaptable to move at least one product toward the front retainer.

4. The motion delivery system of claim 3 wherein the spring is operatively connected to the panel and configured to pull the panel in the first direction.

5. The product delivery system of claim 2 wherein a first portion of the product delivery system is adaptable to contact a first face of the panel and a second portion of the product delivery system is adaptable to contact a second face of the panel.

6. The product delivery system of claim 1 wherein the panel comprises an end and the motion providing device is adaptable to come in contact with the end.

7. The product delivery system of claim 6 wherein the panel comprises polyethylene.

8. The product delivery system of claim 1 wherein the panel comprises a flange and the motion delivery device is adaptable to come in contact with the flange.

9. The product delivery system of claim 1 further comprising product detecting sensors positioned on the panel to sense the product at a location near the front end of the panel and send a signal to said motion providing device to discontinue panel movement in said second direction.

10. The product delivery system of claim 1 wherein the system is adaptable to move the products forward and maintain them in their lateral position on the panel without the assistance of product dividers.

11. The product delivery system of claim 10 further comprising a plurality of product dividers.

* * * * *